US012159090B2

(12) United States Patent
Liu et al.

(10) Patent No.: US 12,159,090 B2
(45) Date of Patent: Dec. 3, 2024

(54) OPTIMAL ALLOCATION METHOD FOR STORED ENERGY COORDINATING ELECTRIC VEHICLES TO PARTICIPATE IN ANCILLARY SERVICE MARKET

(71) Applicants: North China Electric Power University, Beijing (CN); State Grid Electric Vehicle Service Ltd., Beijing (CN)

(72) Inventors: Dunnan Liu, Beijing (CN); Mingguang Liu, Beijing (CN); Xiaofeng Peng, Beijing (CN); Heping Jia, Beijing (CN); Wen Wang, Beijing (CN); Lingxiang Wang, Beijing (CN); Mengjiao Zou, Beijing (CN); Yue Zhang, Beijing (CN); Ye Yang, Beijing (CN); Shu Su, Beijing (CN); Desheng Bai, Beijing (CN)

(73) Assignees: North China Electric Power University, Beijing (CN); State Grid Electric Vehicle Service Ltd., Beijing (CN)

( * ) Notice: Subject to any disclaimer, the term of this patent is extended or adjusted under 35 U.S.C. 154(b) by 826 days.

(21) Appl. No.: 17/338,990

(22) Filed: Jun. 4, 2021

(65) Prior Publication Data
US 2022/0147670 A1    May 12, 2022

(30) Foreign Application Priority Data

Nov. 6, 2020    (CN) .......................... 202011228149.7

(51) Int. Cl.
*G06F 30/27* (2020.01)
*B60L 58/10* (2019.01)
(Continued)

(52) U.S. Cl.
CPC .............. *G06F 30/27* (2020.01); *B60L 58/10* (2019.02); *B60L 58/14* (2019.02); *B60L 58/16* (2019.02);
(Continued)

(58) Field of Classification Search
CPC ...... G06F 30/27; G06F 30/25; G06F 2111/06; G06F 2111/08; G06F 2119/06;
(Continued)

(56) References Cited

PUBLICATIONS

Lin, Whei-Min, et al. "Particle swarm optimisation aided least-square support vector machine for load forecast with spikes." IET Generation, Transmission & Distribution 10.5 (2016): 1145-1153. (Year: 2016).*

(Continued)

*Primary Examiner* — John E Johansen

(57) ABSTRACT

The invention relates to an optimal allocation method for stored energy coordinating electric vehicles (EVs) to participate in auxiliary service market (ASM), including the following steps: 1. Predict the reported capacity of daily 96 points for EVs to participate in the ASM by least square support vector machine (LSSVM). 2. Fit the daily total load distribution of EVs. 3. Determine the error distribution between the reported capacity and the actual response capacity, and simulate the total daily load capacity of EVs in the future with Monte Carlo method. 4. Calculate the energy storage capacity required by EVs daily participating in ASM. 5. Build the objective function to minimize the scheduling risk of auxiliary service. 6. Solve the energy storage model in step 5 with particle swarm optimization (PSO), and output the configuration results of optimal energy storage capacity and energy storage power. The invention can improve the adjustable capacity of EVs participating in ASM.

7 Claims, 3 Drawing Sheets

(51) Int. Cl.
| | |
|---|---|
| B60L 58/14 | (2019.01) |
| B60L 58/16 | (2019.01) |
| G06F 30/25 | (2020.01) |
| G06F 119/06 | (2020.01) |
| G06N 3/006 | (2023.01) |
| G06N 5/01 | (2023.01) |
| G06N 7/01 | (2023.01) |
| G06N 20/10 | (2019.01) |
| G06Q 10/0631 | (2023.01) |
| G06Q 10/0635 | (2023.01) |
| G06Q 50/06 | (2024.01) |
| H02J 3/32 | (2006.01) |
| B60L 55/00 | (2019.01) |
| G06F 111/06 | (2020.01) |
| G06F 111/08 | (2020.01) |
| G06Q 10/04 | (2023.01) |

(52) U.S. Cl.
CPC ............. *G06F 30/25* (2020.01); *G06N 3/006* (2013.01); *G06N 5/01* (2023.01); *G06N 7/01* (2023.01); *G06N 20/10* (2019.01); *G06Q 10/06313* (2013.01); *G06Q 10/06315* (2013.01); *G06Q 10/0635* (2013.01); *G06Q 50/06* (2013.01); *H02J 3/322* (2020.01); *B60L 55/00* (2019.02); *B60L 2260/42* (2013.01); *G06F 2111/06* (2020.01); *G06F 2111/08* (2020.01); *G06F 2119/06* (2020.01); *G06Q 10/04* (2013.01); *Y02E 60/00* (2013.01); *Y02T 10/70* (2013.01); *Y04S 10/126* (2013.01)

(58) Field of Classification Search
CPC .......... B60L 58/10; B60L 58/14; B60L 58/16; B60L 55/00; B60L 2260/42; G06N 3/006; G06N 5/01; G06N 7/01; G06N 20/10; G06Q 10/06313; G06Q 10/06315; G06Q 10/0635; G06Q 50/06; G06Q 10/04; H02J 3/322; Y02E 60/00; Y02T 10/70; Y04S 10/126
USPC .......................................................... 703/13
See application file for complete search history.

(56) References Cited

PUBLICATIONS

Gao, Qiang, et al. "Charging load forecasting of electric vehicle based on Monte Carlo and deep learning." 2019 IEEE Sustainable Power and Energy Conference (iSPEC). IEEE, 2019. (Year: 2019).*

Wu, Hongyu, et al. "A game theoretic approach to risk-based optimal bidding strategies for electric vehicle aggregators in electricity markets with variable wind energy resources." IEEE Transactions on Sustainable Energy 7.1 (2015): 374-385. (Year: 2015).*

* cited by examiner

OPTIMAL ALLOCATION METHOD FOR STORED ENERGY COORDINATING ELECTRIC VEHICLES TO PARTICIPATE IN ANCILLARY SERVICE MARKET

TECHNICAL FIELD

The invention belongs to the technical field of electric vehicle (EV) stored energy optimization configuration, in particular to an optimal allocation method for stored energy coordinating electric vehicles (EVs) to participate in ancillary service market (ASM).

BACKGROUND

With the increasing prominence of global resource and environmental protection, the traditional energy flow structure needs to be improved. To further promote the interaction between supply and demand in China's electricity market reform and encourage third-party entities to participate in auxiliary services is an important means to promote new energy consumption and improve energy utilization efficiency in the age of Energy Internet. China's new energy vehicles are developing rapidly. It is estimated that the number of electric vehicles (EVs) in China will reach 60 million by 2030, and the peak charging load will reach 479GW. At the same time, the participation of demand-side EVs in ASM has great potential, which plays an important role in promoting the consumption of high proportion of renewable energy, reducing the cost of auxiliary service and promoting the stability of load.

The increasing scale of EVs and the continuous development of Vehicle To Grid (V2G) technology make it of great significance for EVs to participate in the research of electric auxiliary services. At the same time, according to the current development stage, the participation of EVs in ASM still has great uncertainty, so bow to coordinate the optimal stored energy configuration of EVs to participate in ASM is a technical problem that need to be solved urgently.

SUMMARY OF INVENTION

The purpose of the invention is to overcome the deficiencies of the prior art and provide an optimal allocation method for stored energy coordinating EVs to participate in ASM, which can improve the adjustable capacity of EVs to participate in auxiliary service.

The invention solves the technical problems by adopting the following technical solutions.

An optimal allocation method for stored energy coordinating EVs to participate in ASM, includes the following steps:

Step 1: The historical load of EVs is collected, and the reported capacity of 96 points per day for EVs to participate in the ASM is predicted by LSSVM.

Step 2: Through the historical total load distribution of EVs collected in Step 1, the daily total load distribution of EVs is fitted.

Step 3: After differentiating the actual load and the capacity results predicted in step 1 for daily EV participation in ASM to obtain the response error, the error distribution between reported capacity and actual response capacity are determined. According to the total daily load distribution function of EVs obtained in Step 2, the response capacity scale of EV load in the future is simulated with Monte Carlo.

Step 4: Based on the simulation results of the response capacity scale of the future EV load obtained in Step 3, the energy storage capacity required by EVs daily participating in ASM is calculated with conditional value at risk (CMaR).

Step 5: Based on the daily 96 points reported capacity curve from step 1 and the daily EV response capacity scale from in step 3, combined with the complementary capacity of the energy storage capacity allocation in step 4, the objective function to minimize the scheduling risk of auxiliary service is constructed, and the risk loss under different response errors is considered to realize the optimal allocation of energy storage capacity.

Step 6: The particle swarm optimization algorithm is used to solve the energy storage model in step 5, and the optimal configuration results of energy storage capacity and energy storage power are output.

The historical load of EVs collected in Step 1 includes the annual daily load and the daily load of 96 points.

In the step 1, the least square support vector machine (LSSVM) is used to predict the daily reported capacity of 96 points of EVs participating in ASM, the specific steps of which are as follows:

(1) Through nonlinear mapping $\psi(x)=(\varphi(x_1), \varphi(x_2), \ldots, \varphi(x_n))$, an optimal decision-making function is established to predict the daily 96 points reported capacity of EVs participating in ASM.

$$f(x)=w^T \times \varphi(x)+b \quad (1)$$

$w \in R^k (k>d)$ are high-dimensional eigen weight vectors, which show the influence degree of each key influence factor on the 96 points load of E $x_i \in R^d$ is the input of 96 points load training sample of d-dimensional EV, while $y_i \in R$ is the output. $b \in R$ is the offset.

(2) According to the principle of structural risk minimization, the optimal w and b are found, and the optimization problem of predicting daily 96 points reported capacity of EVs participating in ASM is obtained as follow.

$$\min \frac{1}{2}w^T w + r \sum_{i=1}^{n} \xi_i^2 \quad (2)$$

r>0 is penalty parameter, $\xi_i$ is slack variable, which is a constant affecting the prediction accuracy and can be solved by PSO.

Compared with the standard support vector machines (SVM), there are differences in constraint conditions, as shown in Equation 3;

$$y[w_T \times \varphi(x_i)+b]=1-\xi_i, i=1,2,\ldots,n \quad (3)$$

(3) Lagrange function is used to solve the optimization problem.

$$L = \frac{1}{2}w^T \times w + r \times \frac{1}{2}\sum_{i=1}^{n}\xi_i^2 - \sum_{i=1}^{n}\alpha_i\{y_i[w^T \times \varphi(x_i)+b]-1+\xi_i\} \quad (4)$$

$$\text{s.t.} \begin{cases} w = \sum_{i=1}^{n}\alpha_i y_i \varphi(x_i) \\ \sum_{i=1}^{n}\alpha_i y_i = 0 \\ \alpha_i = r\xi_i \\ y_i[w^T \times \varphi(x_i)+b]-1+\xi_i = 0 \end{cases}$$

$\alpha_i$ are Lagrange multipliers and $\alpha_i>0$, i=1, 2, . . . , n;

The final prediction function of daily 96 points reported capacity of EVs participating in ASM is shown in Formula (5):

$$f(x) = \sum_{i=1}^{n} \alpha_i K(x, x_i) + b \tag{5}$$

$K(x_i, x_j) = \varphi(x_i)^T \varphi(x_j)$ is a kernel function that satisfies the Mercer condition. With the radial basis kernel function as the kernel function, the kernel function formula is as shown in Formula (6).

$$K(x, x_i) = \exp\left(-\frac{\|x - x_i\|^2}{2g^2}\right) \tag{6}$$

g is the width coefficient of the kernel function and is a constant.

4. According to the optimal stored energy allocation method for coordinating EVs to participate in ASM in the claim 1, the technique is characterized in that the specific methods of the step 2 are as follows.

In the process of curve fitting, annual EV charging load data are collected, samples are selected by random sampling, and normal distribution is adopted for fitting. The normal distribution function is shown in Equation (7).

$$f(x) = \frac{1}{\sqrt{2\pi}} e^{-\frac{(x-\mu)^2}{2\sigma^2}} \tag{7}$$

Then, the parameter estimate is obtained by taking the partial derivative, as shown in Equations (8) and (9).

$$\hat{\mu} = \frac{\sum_{i=1}^{N} x_i}{N} \tag{8}$$

$$\hat{\sigma} = \frac{\sum_{i=1}^{N} (x_i - \mu)^2}{N} = \frac{(X - \mu)^T (X - \mu)}{N} \tag{9}$$

μ is the sample mean of the total daily load of EVs and σ is the variance, which are both important parameters of the normal distribution function. $\hat{\mu}$ and $\hat{\sigma}$ are estimates of the parameters, μ and σ, respectively. N is the number of samples of total daily load of EVs. $x_i$ is the load of the total daily load sample of the ith EV X is the sample set of total daily load of EVs.

The specific steps of the Step 3 are as follows.

(1) According to the LSSVM prediction method in the Step 1, the reported capacity for EVs to participate in ASM in the next day is obtained by several cycles, and the actual response error is obtained by comparing it with the actual response load, so that the error distribution is counted.

(2) According to Step 2, the total daily load distribution function of EV is fitted, and the response capacity scale of EV load in 365 days was simulated with Monte Carlo method.

Wherein, the fitting function is shown in Equation (10).

$$z = \sqrt{2} \, erf^{-1}(2u - 1) \tag{10}$$

u is a random number with a uniform distribution of [0,1], which is the probability of the daily total load distribution of EVs in each stage. Z is the response capacity of the total daily load of the EV following the normal distribution.

The specific steps of the Step 4 are as follows.

The calculation method of CVaR difference capacity based on a certain confidence level can be expressed as Formula (13). Under the energy storage capacity agreement, the response capacity of EVs can be guaranteed to be supplemented at a certain confidence level.

$$f(t, P) = P_t - \sum_{i \in I_t} E_{t\_i} \tag{11}$$

$$P(f(t, P) \le VaR(p)) = 1 - p \tag{12}$$

$$\tilde{F}_\beta(t, P) = a + \frac{1}{m(1-\beta)} \sum_{k=1}^{m} [f(t, P^k) - a]^+ \tag{13}$$

f(t,P) is the power deficiency of EVs. $P_i$ is the reported capacity of the EVs at time t. P is the confidence level. E(P) is the expected power of the EVs at time t. P* is the lowest possible actual response power at time t. $\tilde{F}_\beta(t,P)$ is the energy storage capacity estimated by CVaR to coordinate the electric vehicles participating in ASM. m is the number of data collected. α is the value of VaR. β is the confidence level.

The specific steps of the Step 5 are as follows.

(1) In the process of coordinating EVs to participate in the optimal allocation of stored energy in ASM, in order to minimize the annual scheduling risk for aggregators in ASM, the objective function of the optimal allocation model of stored energy is established as Formula (14).

$$\min Pro = \sum_{d=1}^{365} \left( -W^d + \sum_{t \in T} A_{e\_t}^d - W_u^d - W_l^d \right) + A_b \tag{14}$$

In the function, Pro is the calculation formula for the aggregator's annual scheduling risk. Through optimization operation, the energy storage capacity Q is optimized as follows.

$$Q = Q_u + Q_1 \tag{15}$$

(2) Considering that the energy storage power configuration results will affect the climbing rate, the constraint function of energy storage power P is set as follows.

$$P \ge E_r \times \lambda_2 \tag{16}$$

The calculation method of parameters is as follows.

Daily risk loss of EVs participating in auxiliary services ($W^d$)

After participating in ASM, EV companies can obtain compensation from auxiliary services and can compensate risks through market scheduling so as to create risk losses, which can be calculated as Formula (17).

$$F_t = K^t \times \min\left\{\frac{E_t}{P_{base}^t}, 1\right\} \times \min\{E_t, P_{base}^t\} \times t \times A_{out}^t \tag{17}$$

$$W = \sum_{t \in T} F_t \quad (18)$$

$F_t$ is the auxiliary reward obtained by market entities through peak regulation in time period t. $K^t$ is market factor, which is the reciprocal of the mean load rate of thermal power units in the provincial power network.

$$\min\left\{\frac{E_t}{P_{base}^t}, 1\right\}$$

is Peak adjustment contribution rate. $E_t$ is the peak modulation power of the response in time period t. $P_{base}^t$ base is the reference peak modulation power in time period t. t is response time. $A_{out}^t$ is the market clearing price at time t. W is total revenue per day from providing auxiliary services. T is open hours for auxiliary services;

Daily risk of EVs participating in auxiliary services $$\left(\sum_{t \in T} A_{e\_t}^d\right)$$

In the process of EVs participating in auxiliary services, if the difference between the actual valley filling capacity and the reported capacity exceeds the range prescribed by the market, there will be a loss of opportunity cost. The method to calculate the cost for a single time point is shown in Formula (19).

$$A_{e\_t} = \gamma(K^t \times P_t \times t \times A_{out}^t)$$

$$\begin{cases} \gamma = 0, a < \lambda_1 \\ \gamma = \frac{P_t}{P_{base}^t}, \lambda_1 \le a < \lambda_2 \\ \gamma = 1, a \ge \lambda_2 \end{cases} \quad (19)$$

$A_{e\_t}$ is the load deviation rate. $\gamma$ is the penalty threshold.

$$a = \frac{P_t - P_{base}^t}{P_t}$$

is the load deviation rate. $\lambda_1$ is the penalty threshold.

The daily risk cost, $$\sum_{t \in T} A_{e\_t}^d$$

can be obtained by summing the scheduling costs of 96 points

Energy storage risk loss derived from directly involved in auxiliary services ($W_u^d$)

The method to directly calculate the revenue from providing auxiliary services is shown in Formula (20). Formula (21) is used to calculate the electricity price revenue of auxiliary services. The total risk loss of ASM is shown in Formula (22).

$$w_{u\_t}^d = K^t \times \min\left\{\frac{P_t}{P_{base}^t}, 1\right\} \times \min\{P_t, P_{base}^t\} \times t \times A_{out}^t \quad (20)$$

$$= K^t \times 1 \times P_{battery\_u\_t} \times t \times A_{out}^t$$

$$W_{u\_f}^d = (p_p - p_v) \times Q_u \quad (21)$$

$$W_u^d = W_{u\_f}^d + \sum_{t \in T} w_{u\_t}^d \quad (22)$$

$P_{battery\_u\_t}$ is the charging power of the stored energy that participates in ASM at time t. $P_p$ and $P_v$ are electricity price of stored energy when discharging and charging respectively.

$$Q = Q_u + Q_l$$

$$P \ge E_t \times \lambda_2$$

is the energy storage capacity participating in ASM.

$E_{b\_battery}$ is total capacity configured for stored energy. The superscript d represents the parameter condition of day d. $W_{u\_t}^d$ is the risk loss of auxiliary service that derived from energy storage system directly participating in the auxiliary service at time t. $W_{u\_f}^d$ is the risk loss of peak-valley electricity price and the loss is derived from energy storage resources discharging during non-market period. $W_u^d$ is total risk loss for stored energy to participate in ASM. $W_{l\_t}^d$ is the risk loss that derived from coordinating the stored energy of EVs participating in auxiliary services in time period t. $W_{l\_f}^d$ is the risk loss of peak-valley electricity price, and the loss is derived from coordinating the stored energy participating in auxiliary services. $w_{l\_ev\_t}^d$ is opportunity risk loss that reduced after coordinating stored energy to assist EVs. $W_l^d$ is total risk loss that derived from coordinating energy storage resources.

Risk loss of stored energy to coordinate EVs ($W_l^d$)

In the condition of coordinating stored energy, the auxiliary service income, the peak-valley electricity price income, the reduced opportunity loss and the total revenue are respectively shown in Formula (23) to (26).

$$w_{L\_t}^d = K^t \times \min\left\{\frac{E_t}{P_{base}^t}, 1\right\} \times \min\{E_t, P_{base}^t\} \times t \times A_{out}^t \quad (23)$$

$$= K^t \times 1 \times P_{battery\_L\_t} \times t \times A_{out}^t$$

$$W_{L\_f}^d = (p_p - p_v) \times Q_l \quad (24)$$

$$w_{L\_ev\_t}^d = \gamma(K^t \times E_{t\_b} \times t \times A_{out}^t) \quad (25)$$

$$W_l^d = W_{L\_f}^d + \sum_{t \in T} (w_{L\_t}^d + w_{L\_ev\_t}^d) \quad (26)$$

$P_{battery\_l\_t}$ is the charging power when coordinate the stored energy of EVs to participate in ASM at time t. $Q_l$ is the energy storage capacity of coordinate EVs participating in ASM. $E_{t\_b}$ is the auxiliary adjustment capacity of energy storage at time t.

The annual cost of the storage configuration ($A_b$)

In the calculation of stored energy configuration cost, the calculation formula of the annual value of the battery energy storage system is used as the method to calculate energy storage cost, and the calculation method of relevant parameters are as follows.

$$A_b = (P_{bess} \times \alpha + E_{bess} \times \beta) \times \frac{(1+i)^{T_{life}} \times i}{(1+i)^{T_{life}} - 1} \quad (27)$$

$$\beta = \frac{C_E}{T_{life}} + C_m \quad (28)$$

$$\alpha = \lambda \times \beta \quad (29)$$

$$T_{life} = 1 \Big/ \sum_{i=1}^{N} \frac{1}{K_{eye,D(i)}} \quad (30)$$

$$L_{eye,D} = \eta D^\theta \quad (31)$$

$A_b$ is annual cost of energy storage system. $P_{bess}$ is planning value of energy storage power. $\alpha$ is energy storage power cost in installments. $E_{bess}$ is planning value of energy storage capacity. $\beta$ is energy storage capacity cost in installments. $i$ is interest rate. $T_{life}$ is storage life. $C_E$ is energy storage system investment cost. $C_m$ is maintenance cost of energy storage system. $\lambda$ is the ratio of energy storage system power investment and capacity investment cost. $K_{eye,D(i)}$ is the battery life when the charge and discharge depth is $D_{(i)}$. $L_{eye,D}$ the battery life when the charge and discharge depth of the lithium battery is D. $\eta$ and $\theta$ are important parameters of lithium-ion battery charge-discharge service life, which is determined according to the experimental fitting results.

The specific steps of the Step 6 are as follows.

(1) Parameter determination: initialize the parameters of the PSO algorithm, including population size, initial position and initial velocity.

The initial location is $X_0$, which represents the initial energy storage capacity and power configuration and is randomly generated. The initial velocity is $V_0$, which is the power change step size and is set randomly not to exceed 1. The population size is set to be 5.

(2) Adaptive value calculation: calculate the adaptive value of each particle, and update the position and speed of the particle. The adaptive value is the objective function in Step 5, and the calculation formula is shown as Formula (14). The speed update formula is Formula (32).

$$V_{k+1} = w \times V_k + c_1 \times \text{rand}( ) \times (p_{best} - X_k) + c_2 \times \text{rand}( ) \times (g_{best} - X_k) \quad (32)$$

$V_{k+1}$ is the updated speed. $w$ is the inertial factor. $V_k$ is the current speed. rand( ) is the random number generation function, which can generate random numbers between 0-1. $P_{best}$ is the currently implemented optimal position of the particle. $X_k$ is the current position of the particle. $c_1$ and $c_2$ are learning factors, which learn from the historical best position of the particle and the current best position in the population respectively.

The position update formula is Formula (33).

$$X_{k+1} = X_k + V_{k-1} \quad (33)$$

Finally, the optimal energy storage capacity and power configuration can be obtained through the optimization results.

The advantages and positive effects of the invention are as follows.

The invention takes full advantage of the characteristics of large adjustable capacity, low cost of EVs and strong flexibility and high cost of energy storage resources, and applies the concept of stored energy to coordinate the EVs participating in auxiliary services, so as to give full play to the adjustable potential of EVs while giving fall play to the value of energy storage resources. Based on the principle of minimizing scheduling risk and using CVaR method to schedule the stored energy to participate in auxiliary services, the method can ensure the reliability of the system and minimize the scheduling risk of the system. Based on the principle of minimizing dispatching risk, the invention finally determines the optimal planning strategy and dispatching result for stored energy coordinating EVs to participate in ASM, through coordination strategy research, ASM capacity determination, dispatching risk determination and optimization calculation, so as to improve the adjustable capacity for EVs to participate in the auxiliary service.

DETAILED DESCRIPTION OF PARTICULAR EMBODIMENTS

An embodiment of the invention is further detailed in combination with the attached drawings.

Figure 1:
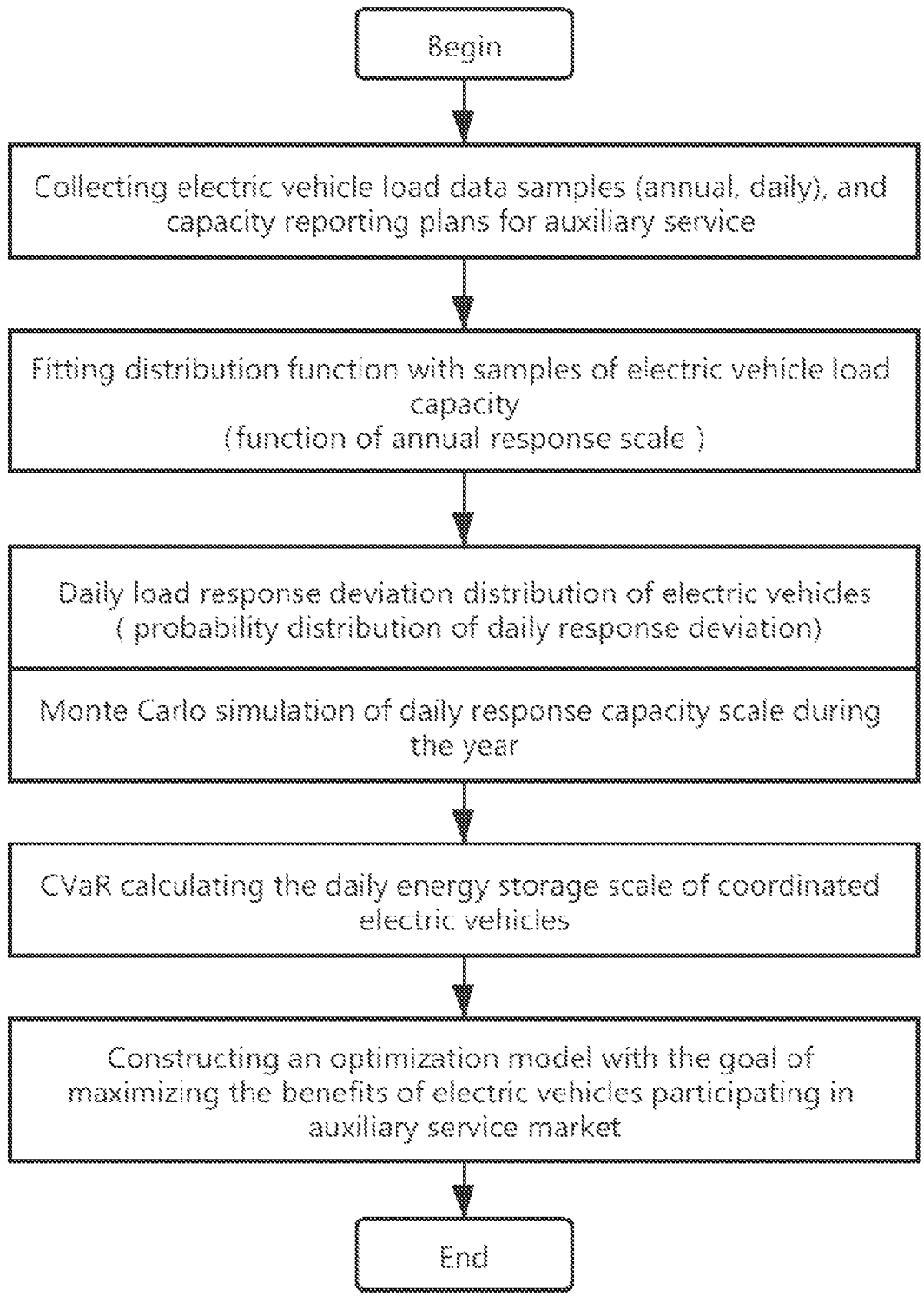
FIG. 1 is a process flow chart of the invention.

An optimal allocation method for stored energy coordinating EVs to participate in ASM, as shown in FIG. 1, includes the following steps.

Step 1: The historical load of EVs is collected, and the reported capacity of 96 points per day for EVs to participate in the ASM is predicted by LSSVM.

In this embodiment, the historical load of the EVs collected in the Step 1 includes the annual daily load and 96 points load per day, and the data scale requires at least 365 days of daily load and 96 points distribution in 30 typical days.

SVM has been widely used in prediction scenarios and achieved fruitful results. It has excellent processing ability for small samples and high latitude data. SVM has good applicability to the situation where the quarterly data of multi-energy coupling is relatively small and the system structure is complex. At the same time, the LSSVM has a significant improvement in the prediction accuracy compared with the traditional SVM. Therefore, the LSSVM that optimized by PSO is used to forecast the daily reporting capacity of EVs participating in ASM.

The nonlinear regression support vector machine (NRSVM) transform the data from the input sample space to the high-dimensional linear feature space through the kernel function, and in the feature space, the nonlinear problem is solved by linear methods, so that the global optimal solution is obtained. LSVM, on the basis of the SVM, changes the inequality constraints into equality constraints so as to accelerate the calculation and improve the accuracy.

In this embodiment, the specific steps with LSSVM to predict the daily 96 points reported capacity of EVs participating in ASM in the Step 1 are as follows.

(1) Through nonlinear mapping $\psi(x)=(\varphi(x_1), \varphi(x_2), \ldots, \varphi(x_n))$, an optimal decision-making function is established to predict the daily 96 points reported capacity of EVs participating in ASM.

$$f(x) = w^T \times \varphi(x) + b \quad (1)$$

$w \in R^k$ (k>D) are high-dimensional eigen weight vectors, which show the influence degree of each key influence factor on the 96 points load of EV $X_i \in R^d$ is the input of 96 points load training sample of d-dimensional EV, while $y_i \in R$ is the output. $b \in R$ is the offset.

(2) According to the principle of structural risk minimization, the optimal w and b are found, and the optimization problem of predicting daily 96 points reported capacity of EVs participating in ASM is obtained as follow.

$$\min \frac{1}{2} w^T w + r \sum_{i=1}^{n} \xi_i^2 \quad (2)$$

r>0 is penalty parameter, $\xi_i$ is slack variable, which is a constant affecting the prediction accuracy and can be solved by PSO.

Compared with the standard support vector machines (SVM), there are differences in constraint conditions, as shown in Equation 3;

$$y[w_T \times \varphi(x_i) + b] = 1 - \xi_i, \ i=1,2,\ldots,n \quad (3)$$

(3) Lagrange function is used to solve the optimization problem.

$$L = \frac{1}{2} w^T \times w + r \times \frac{1}{2} \sum_{i=1}^{n} \xi_i^2 - \sum_{i=1}^{n} \alpha_i \{y_i[w^T \times \varphi(x_i) + b] - 1 + \xi_i\}$$

$$\text{s.t.} \begin{cases} w = \sum_{i=1}^{n} \alpha_i y_i \varphi(x_i) \\ \sum_{i=1}^{n} \alpha_i y_i = 0 \\ \alpha_i = r\xi_i \\ y_i[w^T \times \varphi(x_i) + b] - 1 + \xi_i = 0 \end{cases} \quad (4)$$

$\alpha_i$ are Lagrange multipliers and $\alpha_i > 0$, i=1, 2, . . . , n;

The final prediction function of daily 96 points reported capacity of EVs participating in ASM is shown in Formula (5):

$$f(x) = \sum_{i=1}^{n} \alpha_i K(x, x_i) + b \quad (5)$$

$K(x_i, x_j) = \varphi(x_i)^T \varphi(x_j)$ is a kernel function that satisfies the Mercer condition. With the radial basis kernel function as the kernel function, the kernel function formula is as shown in Formula (6).

$$K(x, x_i) = \exp\left(-\frac{\|x - x_i\|^2}{2g^2}\right) \quad (6)$$

g is the width coefficient of the kernel function and is a constant.

Step 2: Through the historical total load distribution of EVs collected in Step 1, the daily total load distribution of EVs is fitted.

The specific methods of the step 2 are as follows.

In the process of curve fitting, annual EV charging load data are collected, samples are selected by random sampling, and normal distribution is adopted for fitting. The normal distribution function is shown in Equation (7).

$$f(x) = \frac{1}{\sqrt{2\pi}} e^{-\frac{(x-\mu)^2}{2\sigma^2}} \quad (7)$$

Then, the parameter estimate is obtained by taking the partial derivative, as shown in Equations (8) and (9).

$$\hat{\mu} = \frac{\sum_{i=1}^{N} x_i}{N} \quad (8)$$

$$\hat{\sigma} = \frac{\sum_{i=1}^{N} (x_i - \mu)^2}{N} = \frac{(X-\mu)^T(X-\mu)}{N} \quad (9)$$

$\mu$ is the sample mean of the total daily load of EVs and $\sigma$ is the variance, which are both important parameters of the normal distribution function. $\hat{\mu}$ and $\hat{\sigma}$ are estimates of the parameters, $\mu$ and $\sigma$, respectively. N is the number of samples of total daily load of EVs. $x_i$ is the load of the total daily load sample of the ith EV X is the sample set of total daily load of EVs.

Step 3: After differentiating the actual load and the capacity results predicted in step 1 for daily EV participation in ASM to obtain the response error, the error distribution bet-ween reported capacity and actual response capacity are determined. According to the total daily load distribution function of EVs obtained in Step 2, the response capacity scale of EV load in the future is simulated with Monte Carlo.

The specific methods of the step 3 are as follows.

(1) According to the LSSVM prediction method in the Step 1, the reported capacity for EVs to participate in ASM in the next day is obtained by several cycles, and the actual response error is obtained by comparing it with the actual response load, so that the error distribution is counted.

(2) According to Step 2, the total daily load distribution function of EV is fitted, and the response capacity scale of E load in 365 days was simulated with Monte Carlo method.

Wherein, the fitting function is shown in Equation (10).

$$z = \sqrt{2} erf^{-1}(2u-1) \quad (10)$$

u is a random number with a uniform distribution of [0,1], which is the probability of the daily total load distribution of EVs in each stage. z is the response capacity of the total daily load of the EV following the normal distribution.

Step 4: Based on the simulation results of the response capacity scale of the future EV load obtained in Step 3, the energy storage capacity required by EVs daily participating in ASM is calculated with conditional value at risk (CVaR).

The specific methods of the step 4 are as follows.

The calculation method of CVaR difference capacity based on a certain confidence level can be expressed as Formula (13). Under the energy storage capacity agreement, the response capacity of EVs can be guaranteed to be supplemented at a certain confidence level.

$$f(t, P) = P_t - \sum_{i \in I_t} E_{t\_i} \tag{11}$$

$$P(f(t, P) \leq VaR(p)) = 1 - p \tag{12}$$

$$\tilde{F}_\beta(t, P) = \alpha + \frac{1}{m(1-\beta)} \sum_{k=1}^{m} [f(t, P^k) - a]^+ \tag{13}$$

f(t,p) is the power deficiency of EVs, $P_t$ is the reported capacity of the EVs at time t. p is the confidence level. E(P) is the expected power of the EVs at time t. P* is the lowest possible actual response power at time t. $\tilde{F}_\beta(t,P)$ is the energy storage capacity estimated by CVaR to coordinate the electric vehicles participating in ASM. m is the number of data collected. a is the value of VaR. β is the confidence level.

Step 5: Based on the daily 96 points reported capacity curve from step 1 and the daily EV response capacity scale from in step 3, combined with the complementary capacity of the energy storage capacity allocation in step 4, the objective function to minimize the scheduling risk of auxiliary service is constructed, and the risk loss under different response errors is considered to realize the optimal allocation of energy storage capacity.

The specific methods of the step 5 are as follows.

(1) In the process of coordinating EVs to participate in the optimal allocation of stored energy in ASM, in order to minimize the annual scheduling risk for aggregators in ASM, the objective function of the optimal allocation model of stored energy is established as Formula (14).

$$\min Pro = \sum_{d=1}^{365} \left( -W^d + \sum_{t \in T} A_{e\_t}^d - W_u^d - W_l^d \right) + A_b \tag{14}$$

In the function, Pro is the calculation formula for the aggregator's annual scheduling risk, $W^d$ refers to the daily risk loss of EVs participating in auxiliary services on Day d. $A_{e\_t}^d$ is the daily risk cost of the EVs participating in auxiliary services at the time of t on day d. $W_u^d$ is the energy storage risk loss for directly participating in auxiliary services on day d and $W_l^d$ is the energy storage risk loss for coordinating EVs on day d. $A_b$ is the annual cost of stored energy configuration. Through optimization operation, the energy storage capacity Q is optimized as follows.

$$Q = Q_u + Q_l \tag{15}$$

(2) Considering that the energy storage power configuration results will affect the climbing rate, the constraint function of energy storage power P is set as follows.

$$P \geq E_t \times \lambda_2 \tag{16}$$

$E_t$ is the total charging power of the EVs at time t. $\lambda_2$ is the critical proportion of charging power of EVs that do not participate in valley filling auxiliary service.

The calculation method of parameters is as follows.

Daily risk loss of EVs participating in auxiliary services ($W^d$)

After participating in ASM, EV companies can obtain compensation from auxiliary services and can compensate risks through market scheduling so as to create risk losses, which can be calculated as Formula (17).

$$F_t = K^t \times \min\left\{\frac{E_t}{P_{base}^t}, 1\right\} \times \min\{E_t, P_{base}^t\} \times t \times A_{out}^t \tag{17}$$

$$W = \sum_{t \in T} F_t \tag{18}$$

$F_t$ is the auxiliary reward obtained by market entities through peak regulation in time period t. $K^t$ is market factor, which is the reciprocal of the mean load rate of thermal power units in the provincial power network.

$$\min\left\{\frac{E_t}{P_{base}^t}, 1\right\}$$

is Peak adjustment contribution rate. $E_t$ is the peak modulation power of the response in time period t. $P_{base}^t$ is the reference peak modulation power in time period t. t is response time. $A_{out}^t$ is the market clearing price at time t. W is total revenue per day from providing auxiliary services. T is open hours for auxiliary services:

Daily risk of EVs participating in auxiliary services $$\left(\sum_{t \in T} A_{e\_t}^d\right)$$

In the process of EVs participating in auxiliary services, if the difference between the actual valley filling capacity and the reported capacity exceeds the range prescribed by the market, there will be a loss of opportunity cost. The method to calculate the cost for a single time point is shown in Formula (19).

$$A_{e\_t} = \gamma(K^t \times P_t \times t \times A_{out}^t) \tag{19}$$

$$\begin{cases} \gamma = 0, a < \lambda_1 \\ \gamma = \frac{P_t}{P_{base}^t}, \lambda_1 \leq a < \lambda_2 \\ \gamma = 1, a \geq \lambda_2 \end{cases}$$

$A_{e\_t}$ is the penalty cost at time t. γ is the penalty factor.

$$a = \frac{P_t - P_{base}^t}{P_t}$$

is the load deviation rate. $\lambda_1$ is the penalty threshold.
The daily risk cost, $$\sum_{t \in T} A_{e\_t}^d$$

can be obtained by summing the scheduling costs of 96 points.

Energy storage risk loss derived from directly involved in auxiliary services ($W_u^d$)

Figure 2:
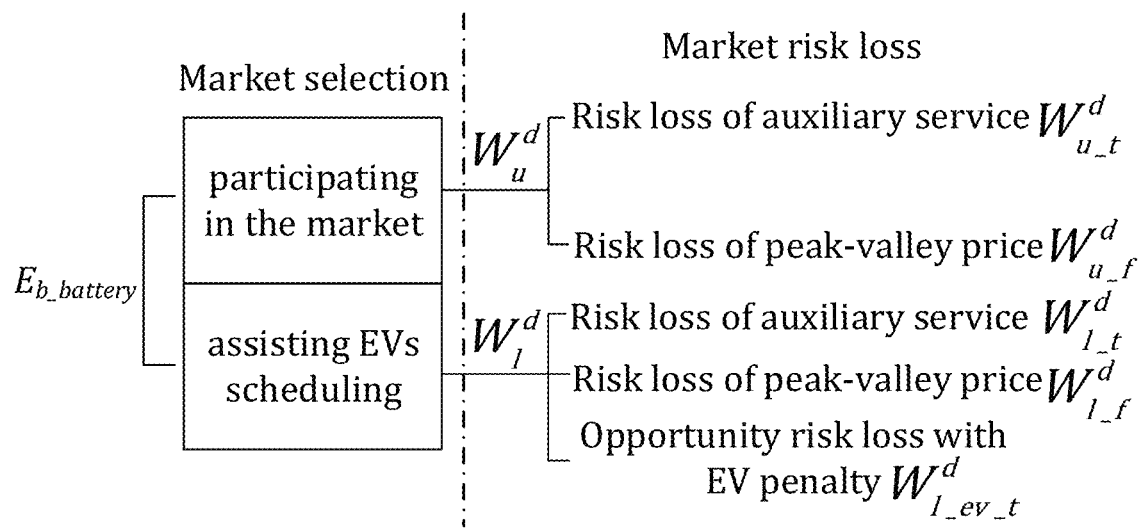
FIG. 2 is the strategy diagram of the stored energy participating in auxiliary service.

FIG. 2 is the strategy diagram of the stored energy participating in auxiliary service. $E_{b\_battery}$ is total capacity configured for stored energy. The superscript d represents the parameter condition of day d. $w_{u\_t}^d$ is the risk loss of auxiliary service that derived from energy storage system directly participating in the auxiliary service at time t. $W_{u\_f}^d$ is the risk loss of peak-valley electricity price and the loss is derived from energy storage resources discharging during non-market period. $W_u^d$ is total risk loss for stored energy to participate in ASM. $W_{l\_t}^d$ is the risk loss that derived from coordinating the stored energy of EVs participating in auxiliary services in time period t. $W_{t\_f}^d$ is the risk loss of peak-valley electricity price, and the loss is derived from coordinating the stored energy participating in auxiliary services. $w_{l\_ev\_t}^d$ is opportunity risk loss that reduced after coordinating stored energy to assist EVs. $W_l^d$ is total risk loss that derived from coordinating energy storage resources.

The method to directly calculate the revenue from providing auxiliary services is shown in Formula (20). Formula (21) is used to calculate the electricity price revenue of auxiliary services. The total risk loss of ASM is shown in Formula (22).

$$w_{u\_t}^d = K^t \times \min\left\{\frac{P_t}{P_{base}^t}, 1\right\} \times \min\{P_t, P_{base}^t\} \times t \times A_{out}^t \quad (20)$$

$$= K^t \times 1 \times P_{battery\_u\_t} \times t \times A_{out}^t$$

$$W_{u\_f}^d = (p_p - p_v) \times Q_u \quad (21)$$

$$W_u^d = W_{u\_f}^d + \sum_{t \in T} w_{u\_t}^d \quad (22)$$

$P_{battery\_u\_t}$ is the charging power of the stored energy that participates in ASM at time t. $p_p$ and $p_v$ are electricity price of stored energy when discharging and charging respectively.

$$Q = Q_u + Q_l$$

$$P \geq E_t \times \lambda_2$$

is the energy storage capacity participating in ASM.

Risk loss of stored energy to coordinate EVs ($W_l^d$)

In the condition of coordinating stored energy, the auxiliary service income, the peak-valley electricity price income, the reduced opportunity loss and the total revenue are respectively shown in Formula (23) to (26).

$$w_{l\_t}^d = K^t \times \min\left\{\frac{E_t}{P_{base}^t}, 1\right\} \times \min\{E_t, P_{base}^t\} \times t \times A_{out}^t \quad (23)$$

$$= K^t \times 1 \times P_{battery\_l\_t} \times t \times A_{out}^t$$

$$W_{l\_f}^d = (p_p - p_v) \times Q_l \quad (24)$$

$$w_{l\_ev\_t}^d = \gamma(K^t \times E_{t\_b} \times t \times A_{out}^t) \quad (25)$$

$$W_l^d = W_{l\_f}^d + \sum_{t \in T}\left(w_{l\_t}^d + w_{l\_ev\_t}^d\right) \quad (26)$$

$P_{battery\_l\_t}$ is the charging power when coordinate the stored energy of EVs to participate in ASM at time t. $Q_l$ is the energy storage capacity of coordinate EVs participating in ASM. $E_{t\_b}$ is the auxiliary adjustment capacity of stored energy at time t.

① The annual cost of the storage configuration ($A_b$)

In the calculation of stored energy configuration cost, the calculation formula of the annual value of the battery energy storage system is used as the method to calculate energy storage cost and the calculation method of relevant parameters are as follows.

$$A_b = (P_{bess} \times \alpha + E_{bess} \times \beta) \times \frac{(1+i)^{T_{life}} \times i}{(1+i)^{T_{life}} - 1} \quad (27)$$

$$\beta = \frac{C_E}{T_{life}} + C_m \quad (28)$$

$$\alpha = \lambda \times \beta \quad (29)$$

$$T_{life} = 1 \bigg/ \sum_{i=1}^{N} \frac{1}{K_{eye,D(i)}} \quad (30)$$

$$L_{eye,D} = \eta D^\theta \quad (31)$$

$A_b$ is annual cost of energy storage system. $P_{bess}$ is planning value of energy storage power. α is energy storage power cost in installments. $E_{bess}$ is planning value of energy storage capacity. β is energy storage capacity cost in installments. i is interest rate. $T_{life}$ is storage life. $C_E$ is energy storage system investment cost. $C_m$ is maintenance cost of energy storage system. λ is the ratio of energy storage system power investment and capacity investment cost. $K_{eye,D(i)}$ is the battery life when the charge and discharge depth is $D_{(i)}$. $L_{eye,D}$ the battery life when the charge and discharge depth of the lithium battery is D. η and θ are important parameters of lithium-ion battery charge-discharge service life, which is determined according to the experimental fitting results.

Step. 6 Solve the energy storage model in step 5 with PSO, and output the configuration results of optimal energy storage capacity and energy storage power.

The specific methods of the step 6 are as follows.

(1) Parameter determination: initialize the parameters of the PSO algorithm, including population size, initial position and initial velocity.

The initial location is $X_0$, which represents the initial energy storage capacity and power configuration and is randomly generated. The initial velocity is $V_0$, which is the power change step size and is set randomly not to exceed 1. The population size is set to be 5.

(2) Adaptive value calculation: calculate the adaptive value of each particle, and update the position and speed of the particle. The adaptive value is the objective function in Step 5, and the calculation formula is shown as Formula (14). The speed update formula is Formula (32).

$$V_{k+1} = w \times V_k + c_1 \times \text{rand}(\ ) \times (p_{best} - X_k) + c_2 \times \text{rand}(\ ) \times (g_{best} - X_k) \quad (32)$$

$V_{k+1}$ is the updated speed. w is the inertial factor. $V_k$ is the current speed. rand( ) is the random number generation function, which can generate random numbers between 0-1. $P_{best}$ is the currently implemented optimal position of the particle. $X_k$ is the current position of the particle. $c_1$ and $c_2$ are learning factors, which learn from the historical best position of the particle and the current best position in the population respectively.

The position update formula is Formula (33).

$$X_{k+1} = X_k + V_{k+1} \quad (33)$$

Finally, the optimal energy storage capacity and power configuration can be obtained through the optimization results.

The invention is further illustrated by a concrete example below.

Step. 1 Collect the historical load of EVs and determine the calculation scheme of daily reported capacity of EVs participating in ASM.

The historical load of EVs is collected, including the annual daily load, the daily load of 96 points. The data scale requires a minimum of 365 days of daily load and a 96 points distribution over 30 typical days. Determinate the calculation method for the daily reported capacity of EVs participating in ASM, that is, the specific plan to forecast by means of time series or big data. The invention adopts SVM for prediction.

Figure 3:
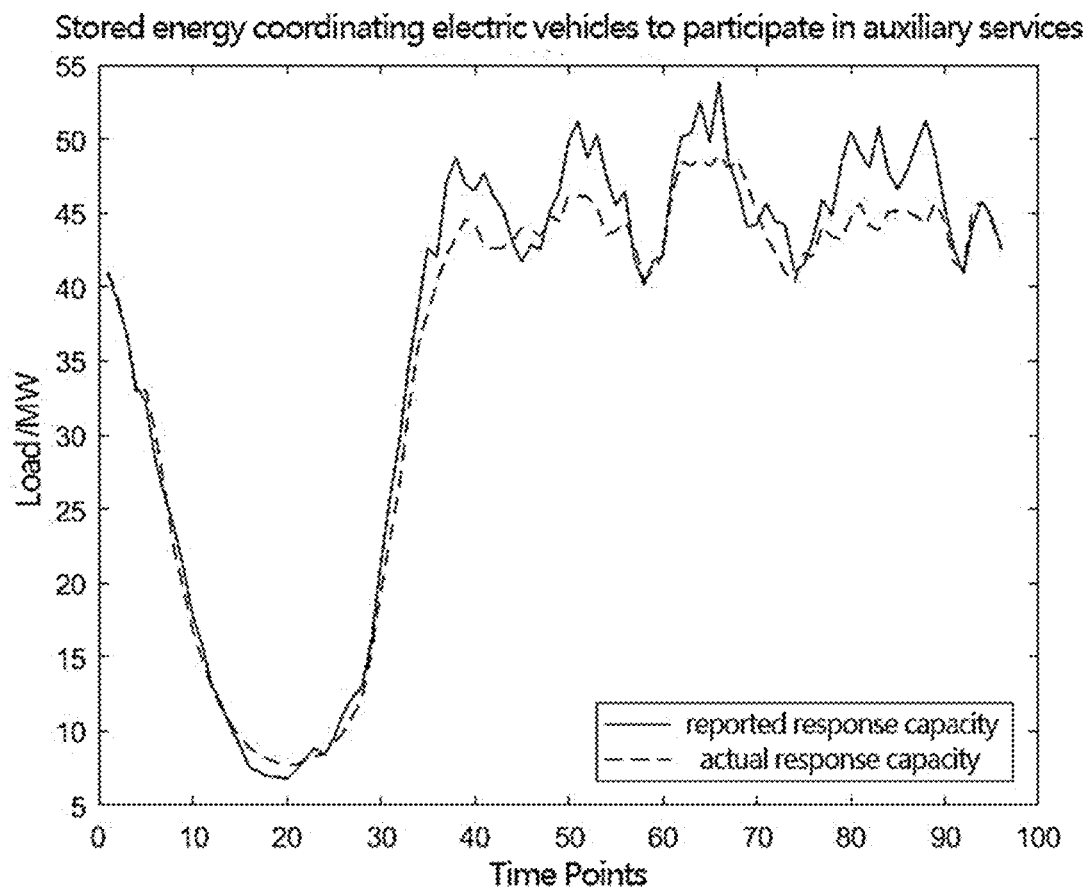
FIG. 3 is a schematic diagram of the relative situation between the reporting capacity and the actual response capacity in the specific embodiments of the invention.

Collect the response capacity data of EVs in Beijing in 2019. With SVM, the model predicts the response capacity, which is reported the plan of daily capacity. The relative situation of the actual response capacity and the reported capacity curve on a certain day is shown in FIG. 3.

Step 2. Through the historical total load distribution of EVs collected in the Step 1, the daily total load distribution of EVs is fitted.

In the process of curve fitting, annual EV charging load data are collected, and samples are selected by random sampling. The sample is fitted with normal distribution, where the normal distribution function is shown in Formula (1).

$$f(x) = \frac{1}{\sqrt{2\pi}} e^{-\frac{(x-\mu)^2}{2\sigma^2}} \tag{1}$$

Calculate the partial derivative of Formula (1) to get the parameter estimate, as Formula (2) and Formula (3)

$$\hat{\mu} = \frac{\sum_{i=1}^{N} x_i}{N} \tag{2}$$

$$\hat{\sigma} = \frac{\sum_{i=1}^{N}(x_i - \mu)^2}{N} = \frac{(X-\mu)^T(X-\mu)}{N} \tag{3}$$

μ and σ are important parameters of the normal distribution function, and $\hat{\mu}$ and $\hat{\sigma}$ are the estimates respectively. N is the number of load samples. $x_i$ is the load of the ith sample. X is EV load sample set.

The distribution of annual EV load can be obtained.

In the process of fitting, the response size of ASM for 100 days was randomly sampled to fit the distribution function, and the results showed that the daily response capacity size obeyed the normal distribution with a mean of 368.88 and a variance of 24.34.

Step 3. Calculate the capacity of daily EV participation in ASM according to the calculation method in Step 1, and make difference between the calculated result and the actual load to get the response error, so that the error distribution of the reported capacity and actual response capacity can be determined. Through the load distribution function of EV obtained in Step 2, the load capacity scale of EV in the future is simulated in Monte Carlo.

According to the SVM prediction method in the Step 1, the reported capacity plan of EVs participating in ASM on the next day was obtained for several cycles, by compared which with the actual response load, the actual response error was obtained, and the error distribution was also calculated. According to the fitting function obtained in Step 2, the response capacity scale of EVs in 365 days is simulated through Monte Carlo.

The inverse function is shown in Formula (4).

$$z=\sqrt{2}\,erf^{-1}(2u-1) \tag{4}$$

u is a random number with a uniform distribution of [0,1], z is the response capacity following normal distribution.

Based on the response capacity reporting scheme obtained in Step 1, the internal load curve of the next day of 960 was calculated, and the response deviation distribution was shown in Table 1.

TABLE 1

The deviation distribution between capacity and actual response capacity is reported

| Deviation interval | Count results | Probability distribution |
|---|---|---|
| 0~0.01 | 245.00 | 0.26 |
| 0.01~0.02 | 260.00 | 0.27 |
| 0.02~0.03 | 168.00 | 0.18 |
| 0.03~0.04 | 109.00 | 0.11 |
| 0.04~0.05 | 68.00 | 0.07 |
| 0.05~0.06 | 50.00 | 0.05 |
| 0.06~0.07 | 27.00 | 0.03 |
| >0.07 | 33.00 | 0.03 |

Figure 4:
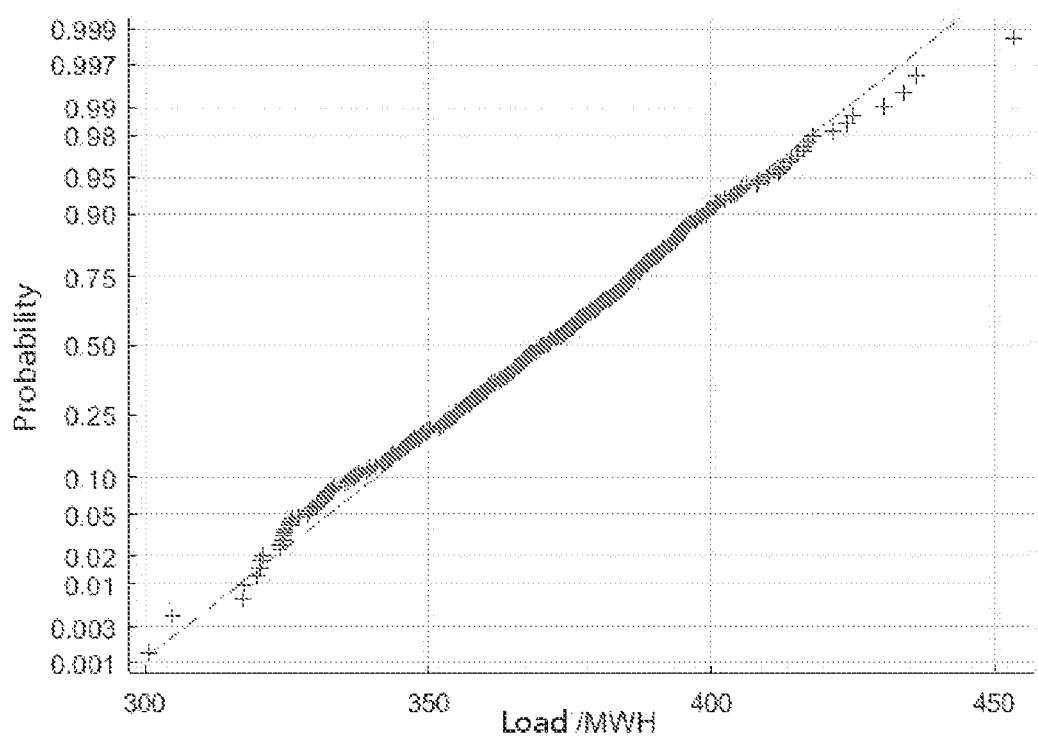
FIG. 4 is a schematic diagram of simulation results of capacity scale of EV load in the specific embodiments of the invention.

Based on the normal distribution function obtained in Step 2 and in combination with the normrnd function in Matlab, the capacity scale of EVs participating in the market in 365 days is simulated. The results are shown in FIG. 4. In FIG. 4, the cross marks represent the market size of EVs participating in auxiliary services per day.

Step 4. Based on the simulation results of the response capacity scale of the EV load, the energy storage demand capacity of daily coordinating the EV's participation in auxiliary services was calculated through CVaR.

The calculation method of CVaR difference capacity based on certain confidence level can be expressed as Formula (8). Under this energy storage capacity agreement, the response capacity of EVs can be supplemented at a certain confidence level.

$$f(t, P) = P_t - \sum_{i \in I_t} E_{t\_i} \tag{6}$$

$$P(f(t, P) \le VaR(p)) = 1 - p \tag{7}$$

$$\tilde{F}_\beta(t, P) = a + \frac{1}{m(1-\beta)} \sum_{k=1}^{m} [f(t, P^k) - a]^+ \tag{8}$$

f(t,P) is shortage power. $P_t$ is the actual response power to be provided at time t. P is the confidence level. E(P) is the expected power at time t. P* is the lowest actual response power that can be provided at time t. $\hat{F}_\beta(t,p)$ is the energy storage capacity that coordinating EV's participating in ASM to response estimated with CVaR. m is the number of data that collected. a is VaR value. β is the confidence level.

Figures 5A, 5B:
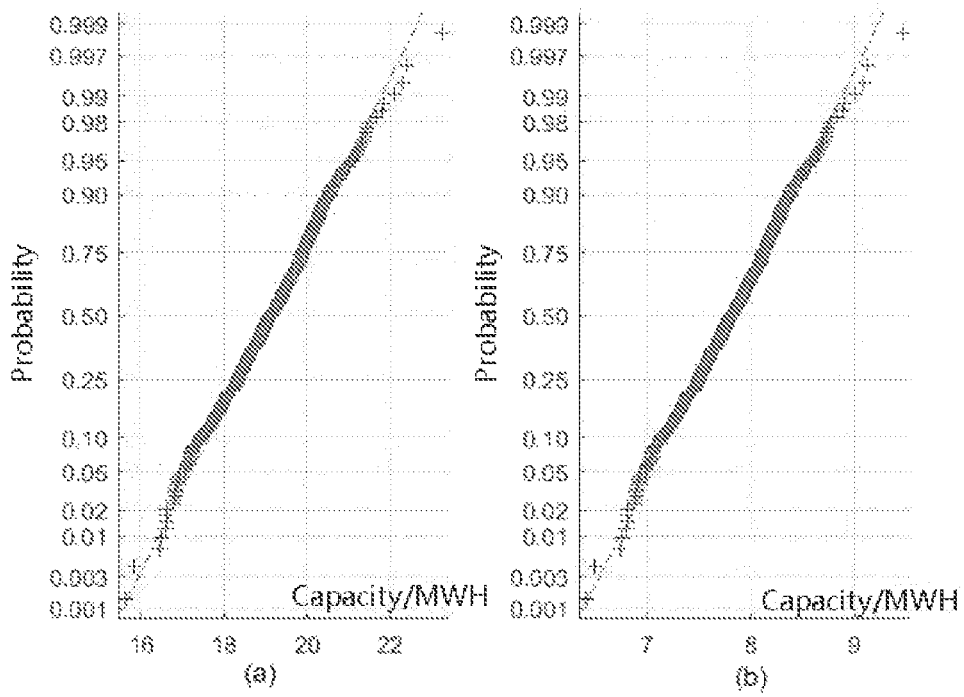
FIG. 5(a) is a schematic diagram of calculation results of daily energy storage reserve capacity in the specific embodiments of the invention (configuration results of profitable stored energy).
FIG. 5(b) is a schematic diagram of calculation results of daily energy storage reserve capacity in the specific embodiments of the invention (configuration results of guaranteed stored energy).

According to the simulation results of load conditions, the confidence was first set as 90%, and the daily peaking reserve energy storage capacity was measured by CVaR method. Supported stored energy and efficient stored energy are defined. Supported stored energy refers to the energy storage capacity configured to keep the load error of EVs within the market boundary. Efficient stored energy is the energy storage capacity configured to make the load error of EVs as close to zero as possible. The distribution of the measured results is shown in FIG. 5. FIG. 5(a) is the result of the beneficial stored energy configuration, that is, in the energy storage configuration mode of this example, the adjusted afterload curve can be guaranteed to completely correspond to the scalar curve. FIG. 5(b) is the result of the supportable energy storage configuration, that is, in the stored energy configuration mode of this example, the adjusted load error can be within the allowable range. In this example, in the case of sufficient stored energy, the efficient stored energy allocation method is preferred. While in the case of insufficient stored energy, the guaranteed stored energy configuration method is selected. When the requirements cannot be met, stored energy chooses to directly participate in tASM and is not responsible for adjusting the load curve of EVs.

Step 5. Based on the daily reported capacity curve obtained in step 1 and daily EVs response capacity scale obtained in step 3, combined with the difference capacity that can be supplemented under the capacity configuration of energy storage resources in step 4, an objective function is constructed to minimize the scheduling risk of auxiliary. Considering the risk loss of different response errors, the optimal configuration of energy storage capacity is realized.

In the process of coordinating EVs to participate in the optimal allocation of stored energy in ASM, in order to minimize the annual scheduling risk of aggregators in the ASM, an objective function (28) was established.

$$\min Pro = \sum_{d=1}^{365}\left(-W^d + \sum_{t \in T} A_{e\_t}^d - W_u^d - W_l^d\right) - A_b \tag{28}$$

Pro is annual scheduling risk calculation formula of aggregator. Optimize the energy storage capacity Q through optimization operation.

$$Q = Q_u + Q_l \tag{29}$$

Considering that the energy storage power configuration results will affect its climbing rate, the constraint function of energy storage power P is set as follows.

$$P \geq E_t \times \lambda_2 \tag{30}$$

The main parameters are calculated as follows.

1) Daily risk loss of EVs participating in auxiliary services, $W^d$

After participating in ASM, EV companies can obtain auxiliary service compensation, and the risks can be compensated through market scheduling so as to make the risk loss. Here the ASM in North China is taken as an example, and the calculation formula of the risk loss is shown in Formula (13).

$$F_t = K^t \times \min\left\{\frac{E_t}{P_{base}^t}, 1\right\} \times \min\{E_t, P_{base}^t\} \times t \times A_{out}^t \tag{13}$$

$$W = \sum_{t \in T} F_t \tag{14}$$

$F_t$ is the auxiliary cost of peak regulation obtained by market entities in time period t. $K^t$ is the market factor, taking the reciprocal of the average load rate of thermal power units in the provincial network, and in this example $K^t$ is 1.2.

$$\min\left\{\frac{E_t}{P_{base}^t}, 1\right\}$$

is peak adjustment contribution rate. $E_t$ is peak modulation power of response in time period t. $P_{base}^t$ base is the benchmark peak modulation power in time period t and t is response time, which is 15 minutes in the example. $A_{out}^t$ is the market clearing price of period t. W is total revenue per day from auxiliary services. T is opening hours for auxiliary services.

2) Daily risk cost of EV participating in ASM, $$\sum_{t \in T} A_{e\_t}^d$$

In the process of EVs participating in auxiliary services, if the difference between the actual valley filling capacity and the reported capacity exceeds the range prescribed by the market, there will be opportunity cost loss, The cost calculation method for a single time point is shown in Formula (15).

$$A_{e\_t} = \gamma(K^t \times P_t \times t) A_{out}^t \tag{15}$$

$$\begin{cases} \gamma = 0, a < \lambda_1 \\ \gamma = \dfrac{P_t}{P_{base}^t}, \lambda_1 \leq a < \lambda_2 \\ \gamma = 1, a \geq \lambda_2 \end{cases}$$

Among them, $A_{e\_t}$ is the penalty cost at time t and $\gamma$ is the penalty factor.

$$a = \frac{P_t - P_{base}^t}{P_t}$$

is load deviation rate and $\lambda_t$ is penalty threshold.

The daily risk cost, $$\sum_{t \in T} A_{e\_t}^d$$

can be obtained by summing the scheduling costs of 96 points.

3) Energy storage risk loss directly involved in auxiliary services, $W_u^d$ $E_{b\_battery}$ is total capacity configured for stored energy. The superscript d represents the parameter condition of day d. $W_{u\_t}^d$ is the risk loss of auxiliary service that derived from energy storage system directly participating in the auxiliary service at time t. $W_{u\_f}^d$ is the risk loss of peak-valley electricity price and the loss is derived from energy storage resources discharging during non-market period. $W_u^d$ is total risk loss for stored energy to participate in ASM. $W_{l\_t}^d$ is the risk loss that derived from coordinating the stored energy of EVs participating in auxiliary services in time period t. $W_{l\_f}^d$ is the risk loss of peak-valley electricity price, and the loss is derived from coordinating the stored energy participating in auxiliary services. $w_{l\_ev\_t}^d$ is opportunity risk loss that reduced after coordinating stored energy to assist EVs. $W_l^d$ is total risk loss that derived from coordinating energy storage resources.

The direct income of auxiliary services is calculated in Formula (16) and income of electricity price of auxiliary services is shown in Formula (17). The total risk loss of ASM is shown in Formula (18).

$$w_{u\_t}^d = K^t \times \min\left\{\frac{P_t}{P_{base}^t}, 1\right\} \times \min\{P_t, P_{base}^t\} \times t \times A_{out}^t \quad (16)$$

$$= K^t \times 1 \times P_{battery\_u\_t} \times t \times A_{out}^t$$

$$W_{u\_f}^d = (p_p - p_v) \times Q_u \quad (17)$$

$$W_u^d = W_{u\_f}^d + \sum_{t \in T} w_{u\_t}^d \quad (18)$$

$P_{battery\_u\_t}$ is the charging power of the stored energy that participates in ASM at time. $p_p$ and $p_v$ are discharge price and charging price of stored energy respectively.

$$Q = Q_u + Q_l$$

$$P \geq E_t \times \lambda_2$$

is energy storage capacity that participate in ASM.

4) risk loss of stored energy that coordinating EVs, $W_l^d$

In the condition of coordinating stored energy, the auxiliary service income, the peak-valley electricity price income, the reduced opportunity loss and the total revenue are respectively shown in Formula (19) to (22).

$$w_{l\_t}^d = K^t \times \min\left\{\frac{E_t}{P_{base}^t}, 1\right\} \times \min(E_t, P_{base}^t) \times t \times A_{out}^t \quad (19)$$

$$= K^t \times 1 \times P_{battery\_l\_t} \times t \times A_{out}^t$$

$$W_{l\_f}^d = (p_p - p_v) \times Q_l \quad (20)$$

$$w_{l\_ev\_t}^d = \gamma(K^t \times E_{t\_b} \times t \times A_{out}^t) \quad (21)$$

$$W_l^d = w_{l\_f}^d + \sum_{t \in T}\left(w_{l\_t}^d + w_{l\_ev\_t}^d\right) \quad (22)$$

$P_{battery\_l\_t}$ is the charging power when coordinate the stored energy of EVs to participate in ASM at time t. $Q_l$ is the energy storage capacity of coordinate EVs participating in ASM. $E_{t\_b}$ is the auxiliary adjustment capacity of stored energy at time t.

5) The annual cost of the storage configuration, $A_b$

In the calculation of energy storage configuration cost, the calculation formula of the annual value of the battery energy storage system is used as the method to calculate energy storage cost, and the calculation method of relevant parameters are as follows.

$$A_b = (P_{bess} \times \alpha + E_{bess} \times \beta) \times \frac{(1+i)^{T_{life}} \times i}{(1+i)^{T_{life}} - 1} \quad (23)$$

$$\beta = \frac{C_E}{T_{life} + C_m} \quad (24)$$

$$\alpha = \lambda \cdot \beta \quad (25)$$

$$T_{life} = 1 \bigg/ \sum_{i=1}^{N} \frac{1}{K_{eye,D(i)}} \quad (26)$$

$$L_{eye,D} = \eta D^\theta \quad (27)$$

$A_b$ is annual cost of energy storage system. $P_{bess}$ is planning value of energy storage power. $\alpha$ is energy storage power cost in installments. $E_{bess}$ is planning value of energy storage capacity. $\beta$ is energy storage capacity cost in installments. i is interest rate. $T_{life}$ is storage life. $C_E$ is energy storage system investment cost. $C_m$ is maintenance cost of energy storage system. $\lambda$ is the ratio of energy storage system power investment and capacity investment cost. $K_{eyeD(i)}$ is the battery life when the charge and discharge depth is $D_{(i)}$. $L_{eye,D}$ the battery life when the charge and discharge depth of the lithium battery is D. $\eta$ and $\theta$ are important parameters of lithium-ion battery charge-discharge service life, which is determined according to the experimental fitting results. In this example, $\eta$ is 694, $\theta$ is −0.795.

Step 6. PSO algorithm is used to solve the model, and the output results are the configuration result of the optimal energy storage capacity and energy storage power.

The market error range of auxiliary services is set to be no more than 5%, and the clearing price of auxiliary services is Y300/MWh. According to the general industrial and commercial electricity price in Beijing, the peak-valley electricity price difference is Y1030/MWh, and the peak-flat electricity price difference is Y500/MWh. The investment cost is Y5166000/MWh, and the maintenance cost is Y174000/MWh/year, The ratio of power investment of energy storage system and capacity investment cost is 1.172, and the level of the market interest rate is 8%.

Based on the optimal stored energy allocation strategy, the reported capacity, the proportion of EV load, the proportion of energy storage load, the scheduling capacity and the opportunity loss are calculated. The results are shown in Table 2.

TABLE 2

Simulation results of typical daily market operation

| Typical daily auxiliary service participation capacity (MW) | Ratio of EV load (%) | Ratio of energy storage load (%) | Adjustable EV capacity (MW) |
| --- | --- | --- | --- |
| 372.25 | 96.7% | 3.3% | 18.5% |
| 364.07 | 93.4% | 6.6% | 20.6% |
| 379.81 | 94.7% | 5.3% | 19.4% |
| 354.54 | 95.2% | 4.8% | 22.8% |
| 371.80 | 93.4% | 6.6% | 17.0% |
| 350.05 | 94.4% | 5.6% | 20.9% |

In the daily operation process, the stored energy makes the load curve of EVs as close as possible to the actual reported curve through constant adjustment of charge and discharge, so as to increase the income of EVs participating in ASM as much as possible.

It needs to be emphasized that the embodiments described in the invention are illustrative rather than restrictive, so the invention includes but is not limited to the embodiments described in the specific embodiments, and all other embodiments derived by the technical personnel in the field according to the technical scheme of the invention are also covered by the protection of the invention.

What is claimed is:

1. An optimal allocation method for stored energy coordinating electric vehicles (EVs) to participate in ancillary service market (ASM), comprising the following steps:
   step 1: the historical load of EVs is collected, and the reported capacity of 96 points per day for EVs to participate in ASM is predicted by a least square support vector machine (LSSVM);

step 2: through the historical total load distribution of EVs collected in step 1, the daily total load distribution of EVs is fitted;

step 3: after differentiating the actual load and the capacity results predicted in step 1 for daily EV participation in ASM to obtain the response error, an error distribution between reported capacity and actual response capacity are determined, according to the total daily load distribution function of EVs obtained in step 2, the response capacity scale of EV load in the future is simulated with Monte Carlo;

step 4: based on the simulation results of the response capacity scale of the future EV load obtained in step 3, the energy storage capacity required by EVs daily participating in ASM is calculated with conditional value at risk (CVaR);

step 5: based on the daily 96 points reported capacity curve from step 1 and the daily EV response capacity scale from in step 3, combined with the complementary capacity of the energy storage capacity allocation in step 4, the objective function to minimize the scheduling risk of auxiliary service is constructed, and the risk loss under different response errors is considered to realize the optimal allocation of energy storage capacity;

step 6: the particle swarm optimization algorithm is used to solve the energy storage model in step 5, and the optimal configuration results of energy storage capacity and energy storage power are output;

wherein the specific methods in the step 5 are as follows:

(1) in the process of coordinating EVs to participate in the optimal allocation of stored energy in ASM, in order to minimize the annual scheduling risk for aggregators in ASM, the objective function of the optimal allocation model of stored energy is established as Formula (14):

$$\min Pro = \sum_{d=1}^{365}\left(-W^d + \sum_{t \in T} A_{e\_t}^d - W_u^d - W_l^d\right) + A_b \quad (14)$$

in the function, Pro is the calculation formula for the aggregator's annual scheduling risk, $W^d$ refers to the daily risk loss of EVs participating in auxiliary services on Day d, $A_{e\_t}^d$ is the daily risk cost of the EVs participating in auxiliary services at the time of t on day d, $W_u^d$ is the energy storage risk loss for directly participating in auxiliary services on day d and $W_l^d$ is the energy storage risk loss for coordinating EVs on day d, $A_b$ is the annual cost of energy storage configuration; through optimization operation, the energy storage capacity Q is optimized as follows:

$$Q = Q_u + Q_l \quad (15)$$

(2) considering that the energy storage power configuration results affect the climbing rate, the constraint function of energy storage power P is set as follows:

$$P \geq E_1 \times \lambda_2 \quad (16)$$

$E_i$ is the total charging power of EVs at time t, $\lambda_2$ is the critical proportion of charging power of EVs that do not participate in valley filling auxiliary service;

the calculation method of parameters is as follows:

① the daily risk loss of EVs participating in auxiliary services $W^d$ after participating in ASM, EV companies obtain compensation from auxiliary services and compensate risks through market scheduling so as to create risk losses, which is calculated as Formula (17):

$$F_t = K^t \times \min\left\{\frac{E_t}{P_{base}^t}, 1\right\} \times \min\{E_t, P_{base}^t\} \times t \times A_{out}^t \quad (17)$$

$$W = \sum_{t \in T} F_t \quad (18)$$

$F_t$ is the auxiliary reward obtained by market entities through peak regulation in time period t, $K^t$ is market factor, which is the reciprocal of the mean load rate of thermal power units in the provincial power network;

$$\min\left\{\frac{E_t}{P_{base}^t}, 1\right\}$$

is peak adjustment contribution rate, $E_t$ is the peak modulation power of the response in time period t, $P_{base}^t$ is the reference peak modulation power in time period t, t is response time, $A_{out}^t$ out is the market clearing price at time t, W is total revenue per day from providing auxiliary services, T is open hours for auxiliary services;

② daily risk cost of EVs participating in auxiliary services $$\sum_{t \in T} A_{e\_t}^d$$

in the process of EVs participating in auxiliary services, when the difference between the actual valley filling capacity and the reported capacity exceeds the range prescribed by the market, there is a loss of opportunity cost; the method to calculate the cost for a single time point is shown in Formula (19):

$$A_{e\_t} = \gamma(K^t \times P_t \times t \times A_{out}^t) \quad (19)$$

$$\begin{cases} \gamma = 0, a < \lambda_1 \\ \gamma = \frac{P_t}{P_{base}^t}, \lambda_1 \leq a < \lambda_2 \\ \gamma = 1, a \geq \lambda_2 \end{cases}$$

$A_{e\_t}$ is the penalty cost at time t, $\gamma$ is the penalty factor, $$a = \frac{P_t - P_{base}^t}{P_t}$$

is the load deviation rate, $\lambda_1$ is the penalty threshold; the daily risk cost $$\sum_{t \in T} A_{e\_t}^d$$

is obtained by summing the scheduling costs of 96 points;

③ energy storage risk loss derived from directly involved in auxiliary services $W_u^d$ the method to directly calculate the revenue from providing auxiliary services is shown in Formula (20), Formula (21) is used to calculate the electricity price revenue of auxiliary services, the total risk loss of ASM is shown in Formula (22);

$$w_{u\_t}^d = K^t \times \min\left\{\frac{P_t}{P_{base}^t}, 1\right\} \times \min\{P_t, P_{base}^t\} \times t \times A_{out}^t \quad (20)$$

$$= K^t \times 1 \times P_{battery\_u\_t} \times t \times A_{out}^t$$

$$W_{u\_f}^d = (p_p - p_v) \times Q_u \quad (21)$$

$$W_u^d = W_{u\_f}^d + \sum_{t \in T} w_{u\_t}^d \quad (22)$$

$P_{battery\_u\_t}$ is the charging power of the stored energy that participates in ASM at time t, $p_p$ and $p_v$ are electricity price of stored energy when discharging and charging respectively, $$Q = Q_u + Q_l$$

$$P \geq E_t \times \lambda_2$$

is the energy storage capacity participating in ASM; $E_{b\_battery}$ is total capacity configured for stored energy, the superscript d represents the parameter condition of day d, $w_{u\_}^t$ is the risk loss of auxiliary service that derived from energy storage system directly participating in the auxiliary service at time t, $W_{u\_f}^d$ is the risk loss of peak-valley electricity price and the loss is derived from energy storage resources discharging during non-market period, $W_u^d$ is total risk loss for stored energy to participate in ASM, $w_{l\_t}^d$ is the risk loss that derived from coordinating the stored energy of EVs participating in auxiliary services in time period t, $W_{l\_f}^d$ is the risk loss of peak-valley electricity price, and the loss is derived from coordinating the stored energy participating in auxiliary services, $w_{l\_ev\_t}^d$ is opportunity risk loss that reduced after coordinating stored energy to assist EVs, $W_l^d$ is total risk loss that derived from coordinating energy storage resources;

④ the energy storage risk loss for coordinating EVs $W_l^d$ in the condition of coordinating stored energy, the auxiliary service income, the peak-valley electricity price income, the reduced opportunity loss and the total revenue are respectively shown in Formula (23) to (26):

$$w_{l\_t}^d = K^t \times \min\left\{\frac{E_t}{P_{base}^t}, 1\right\} \times \min\{E_t, P_{base}^t\} \times t \times A_{out}^t \quad (23)$$

$$= K^t \times 1 \times P_{battery\_l\_t} \times t \times A_{out}^t$$

$$W_{l\_f}^d = (p_p - p_v) \times Q_l \quad (24)$$

$$w_{l\_ev\_t}^d = \gamma(K^t \times E_{t\_b} \times t \times A_{out}^t) \quad (25)$$

$$W_l^d = W_{l\_f}^d + \sum_{t \in T}\left(w_{l\_t}^d + w_{l\_ev\_t}^d\right) \quad (26)$$

$P_{battery\_l\_t}$ is the charging power when coordinate the stored energy of EVs to participate in ASM at time t, $Q_l$ is the energy storage capacity of coordinate EVs participating in ASM, $E_{t\_b}$ is the auxiliary adjustment capacity of stored energy at time t;

⑤ the annual cost of energy storage configuration $A_b$, in the calculation of energy storage configuration cost, the calculation formula of the annual value of the battery energy storage system is used as the method to calculate energy storage cost, and the calculation method of relevant parameters are as follows:

$$A_b = (P_{bess} \times \alpha + E_{bess} \times \beta) \times \frac{(1+i)^{T_{life}} \times i}{(1+i)^{T_{life}} - 1} \quad (27)$$

$$\beta = \frac{C_E}{T_{life}} + C_m \quad (28)$$

$$\alpha = \lambda \times \beta \quad (29)$$

$$T_{life} = 1 \Big/ \sum_{i=1}^{N} \frac{1}{K_{eye,D(i)}} \quad (30)$$

$$L_{eye,D} = \eta D^\theta \quad (31)$$

$A_b$ is annual cost of energy storage system, $P_{bess}$ is planning value of energy storage power, $\alpha$ is energy storage power cost in installments, $E_{bess}$ is planning value of energy storage capacity, $\beta$ is energy storage capacity cost in installments, i is interest rate, $T_{life}$ is storage life, $C_E$ is energy storage system investment cost, $C_m$ is maintenance cost of energy storage system, $\lambda$ is the ratio of energy storage system power investment and capacity investment cost, $K_{eye,D(i)}$ is the battery life when the charge and discharge depth is $D_{(i)}$, $L_{eye,D}$ is the battery life when the charge and discharge depth of the lithium battery is D, $\eta$ and $\theta$ are important parameters of lithium-ion battery charge-discharge service life, which is determined according to the experimental fitting results.

2. According to the optimal allocation method for stored energy coordinating EVs to participate in ASM in the claim 1, wherein the historical load of EVs collected in step 1 includes the annual daily load and daily load of 96 points.

3. According to the optimal allocation method for stored energy coordinating EVs to participate in ASM in the claim 1, wherein the specific steps of step 1 to predict the daily 96 points reported capacity of EVs participating in ASM by LSSVM are as follows:

(1) through nonlinear mapping $\psi(x)=(\varphi(x_1), \varphi(x_2), \ldots, \varphi(x_n))$, an optimal decision-making function is established to predict the daily 96 points reported capacity of EVs participating in ASM, $$f(x)=w^T \times \varphi(x)+b \quad (1)$$

$w \in R^k$ (k>d) are high-dimensional eigen weight vectors, which show the influence degree of each key influence factor on the 96 points load of EV, $x_i \in R^d$ is the input of 96 points load training sample of d-dimensional EV, while $y_i \in R$ is the output, $b \in R$ is the offset;

(2) according to the principle of structural risk minimization, the optimal W and b are found, and the optimization problem of predicting daily 96 points reported capacity of EVs participating in ASM is obtained as follow:

$$\min \frac{1}{2}w^T w + r \sum_{i=1}^{n} \xi_i^2 \quad (2)$$

r>0 is penalty parameter, $\xi_i$ is slack variable, which is a constant affecting the prediction accuracy and is solved by PSO;

compared with the standard support vector machines (SVM), there are differences in constraint conditions, as shown in Equation 3;

$$y[w_T \times \varphi(x_i)+b]=1-\xi_i, \ i=1,2,\ldots,n \qquad (3)$$

(3) Lagrange function is used to solve the optimization problem:

$$L = \frac{1}{2}w^T w + r \times \frac{1}{2}\sum_{i=1}^{n}\xi_i^2 - \sum_{i=1}^{n}\alpha_i\{y_i[w^T \times \varphi(x_i) + b] - 1 + \xi_i\} \qquad (4)$$

$$\text{s.t.} \begin{cases} w = \sum_{i=1}^{n}\alpha_i y_i \varphi(x_i) \\ \sum_{i=1}^{n}\alpha_i y_i = 0 \\ \alpha_i = r\xi_i \\ y_i[w^T \times \varphi(x_i) + b] - 1 + \xi_i = 0 \end{cases}$$

$\alpha_i$ are Lagrange multipliers and $\alpha_i > 0$, i=1, 2, ..., n;

the final prediction function of daily 96 points reported capacity of EVs participating in ASM is shown in Formula (5):

$$f(x) = \sum_{i=1}^{n}\alpha_1 K(x, x_i) + b \qquad (5)$$

$K(x_i, x_j) = \varphi(x)^T \varphi(x_j)$ is a kernel function that satisfies the Mercer condition; with the radial basis kernel function as the kernel function, the kernel function formula is as shown in Formula (6):

$$K(x, x_i) = \exp\left(-\frac{\|x - x_i\|^2}{2g^2}\right) \qquad (6)$$

g is the width coefficient of the kernel function and is a constant.

4. According to the optimal stored energy allocation method for coordinating EVs to participate in ASM in the claim 1, wherein the specific methods of the step 2 are as follows:

in the process of curve fitting, annual EV charging load data are collected, samples are selected by random sampling, and normal distribution is adopted for fitting, the normal distribution function is shown in Equation (7):

$$f(x) = \frac{1}{\sqrt{2\pi}}e^{-\frac{(x-\mu)^2}{2\sigma^2}} \qquad (7)$$

then, the parameter estimate is obtained by taking the partial derivative, as shown in Equations (8) and (9):

$$\hat{\mu} = \frac{\sum_{i=1}^{N}x_i}{N} \qquad (8)$$

$$\hat{\sigma} = \frac{\sum_{i=1}^{N}(x_i - \mu)^2}{N} = \frac{(X - \mu)^T(X - \mu)}{N} \qquad (9)$$

$\mu$ is the sample mean of the total daily load of EVs and @ is the variance, which are both important parameters of the normal distribution function, $\hat{\mu}$ and $\hat{\sigma}$ are estimates of the parameters, $\mu$ and $\sigma$, respectively; N is the number of samples of total daily load of EVs, $x_i$ is the load of the total daily load sample of the ith EV, X is the sample set of total daily load of EVs.

5. According to the optimal method of stored energy allocation for coordinating EVs participating in ASM in the claim 1, wherein the specific methods in the step 3 are as follows:

(1) according to the LSSVM prediction method in the step 1, the reported capacity for EVs to participate in ASM in the next day is obtained by several cycles, and the actual response error is obtained by comparing it with the actual response load, so that the error distribution is counted;

(2) according to step 2, the total daily load distribution function of EV is fitted, and the response capacity scale of EV load in 365 days is simulated with Monte Carlo method;

wherein, the fitting function is shown in Equation (10):

$$z = \sqrt{2}_{erf}^{-1}(2u-1) \qquad (10)$$

u is a random number with a uniform distribution of [0,1], which is the probability of the daily total load distribution of EVs in each stage; z is the response capacity of the total daily load of the EV following the normal distribution.

6. According to the optimal method of stored energy allocation for coordinating EVs participating in ASM in the claim 1, wherein the specific methods in the step 4 are as follows:

the calculation method of CVaR difference capacity based on a certain confidence level can be expressed as Formula (13), under the energy storage capacity agreement, the response capacity of EVs can be guaranteed to be supplemented at a certain confidence level;

$$f(t, P) = P_t - \sum_{i \in I_i} E_{t\_i} \qquad (11)$$

$$P(f(t, P) \le VaR(p)) = 1 - p \qquad (12)$$

$$\tilde{F}_\beta(t, P) = a + \frac{1}{m(1-\beta)}\sum_{k=1}^{m}[f(t, P^k) - a]^+ \qquad (13)$$

f(t,P) is the power deficiency of EVs, $P_t$ is the reported capacity of the EVs at time t, P is the confidence level, E(P) is the expected power of the EVs at time t, P* is the lowest possible actual response power at time t, $\tilde{F}_\beta(t,P)$ is the energy storage capacity estimated by CVaR to coordinate the electric vehicles participating in ASM, m is the number of data collected, a is the value of VaR, $\beta$ is the confidence level.

7. According to the optimal method of stored energy allocation for coordinating EVs participating in ASM in the claim 1, wherein the calculation steps of PSO algorithm in step 6 are as follows:

(1) parameter determination: initialize the parameters of the PSO algorithm, including population size, initial position and initial velocity;

the initial location is $X_0$, which represents the initial energy storage capacity and power configuration and is randomly generated; the initial velocity is $V_0$, which is the power change step size and is set randomly not to exceed 1; the population size is set to be 5;

(2) adaptive value calculation: calculate the adaptive value of each particle, and update the position and speed of the particle; the adaptive value is the objective function in step 5, and the calculation formula is shown as Formula (14), the speed update formula is Formula (32):

$$V_{k+1}=w \times V_k + c_1 \times \text{rand}(\ ) \times (p_{best}-X_k) + c_2 \times \text{rand}(\ ) \times (g_{best}-X_k) \quad (32)$$

$V_{k+1}$ is the updated speed, W is the inertial factor, V is the current speed, rand( ) is the random number generation function, which generates random numbers between 0-1, $p_{best}$ is the currently implemented optimal position of the particle, $X_k$ is the current position of the particle, $c_1$ and $c_2$ are learning factors, which learn from the historical best position of the particle and the current best position in the population respectively;

the position update formula is Formula (33):

$$X_{k+1}=X_k+V_{k+1} \quad (33)$$

finally, the optimal energy storage capacity and power configuration is obtained through the optimization results.

\* \* \* \* \*